March 10, 1970     D. T. GREEN     3,499,591
INSTRUMENT FOR PLACING LATERAL GASTRO-INTESTINAL ANASTOMOSES
Filed June 23, 1967     9 Sheets-Sheet 1

INVENTOR
DAVID T. GREEN
BY
Stevens, Davis, Miller & Mosher
ATTORNEYS

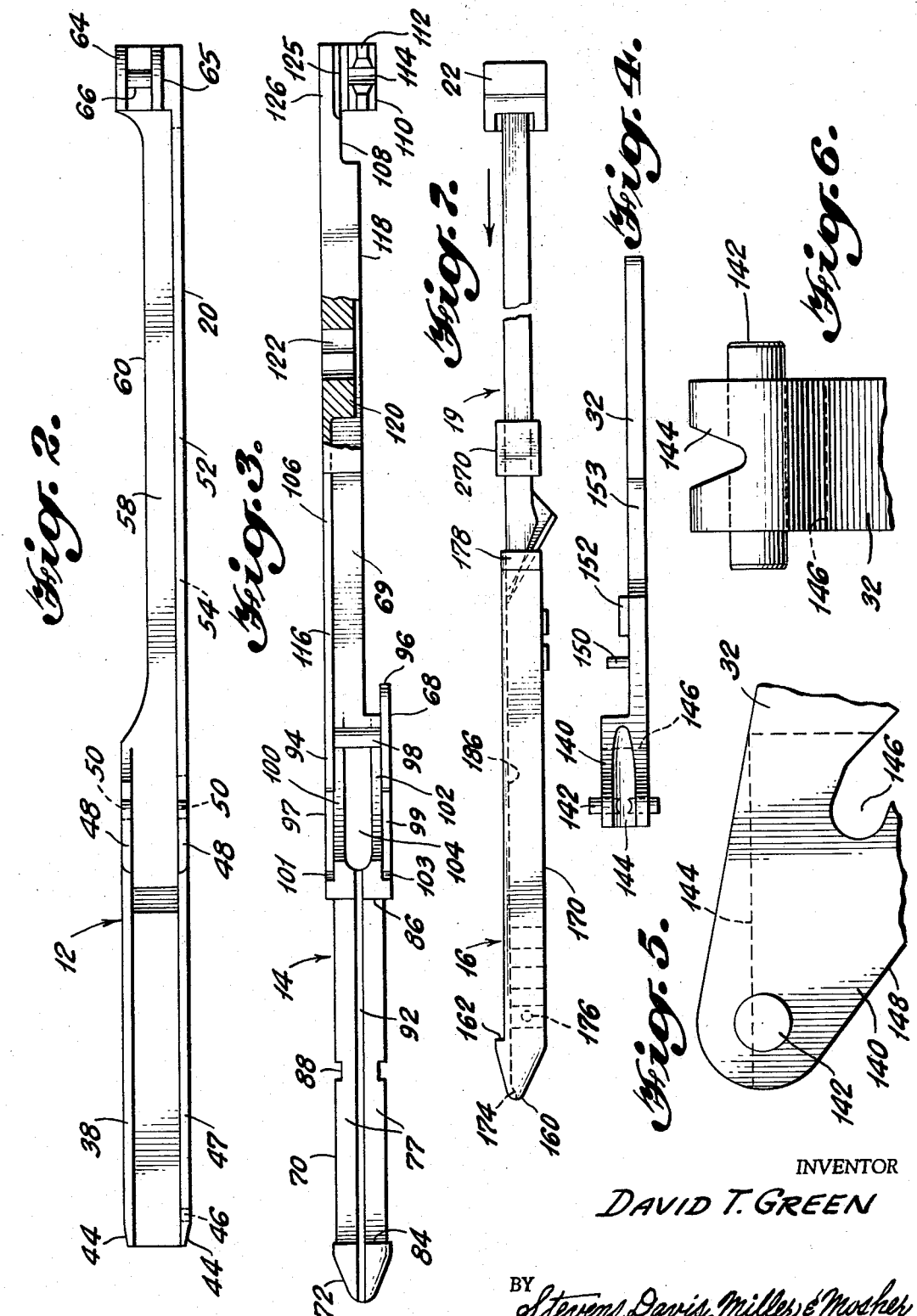

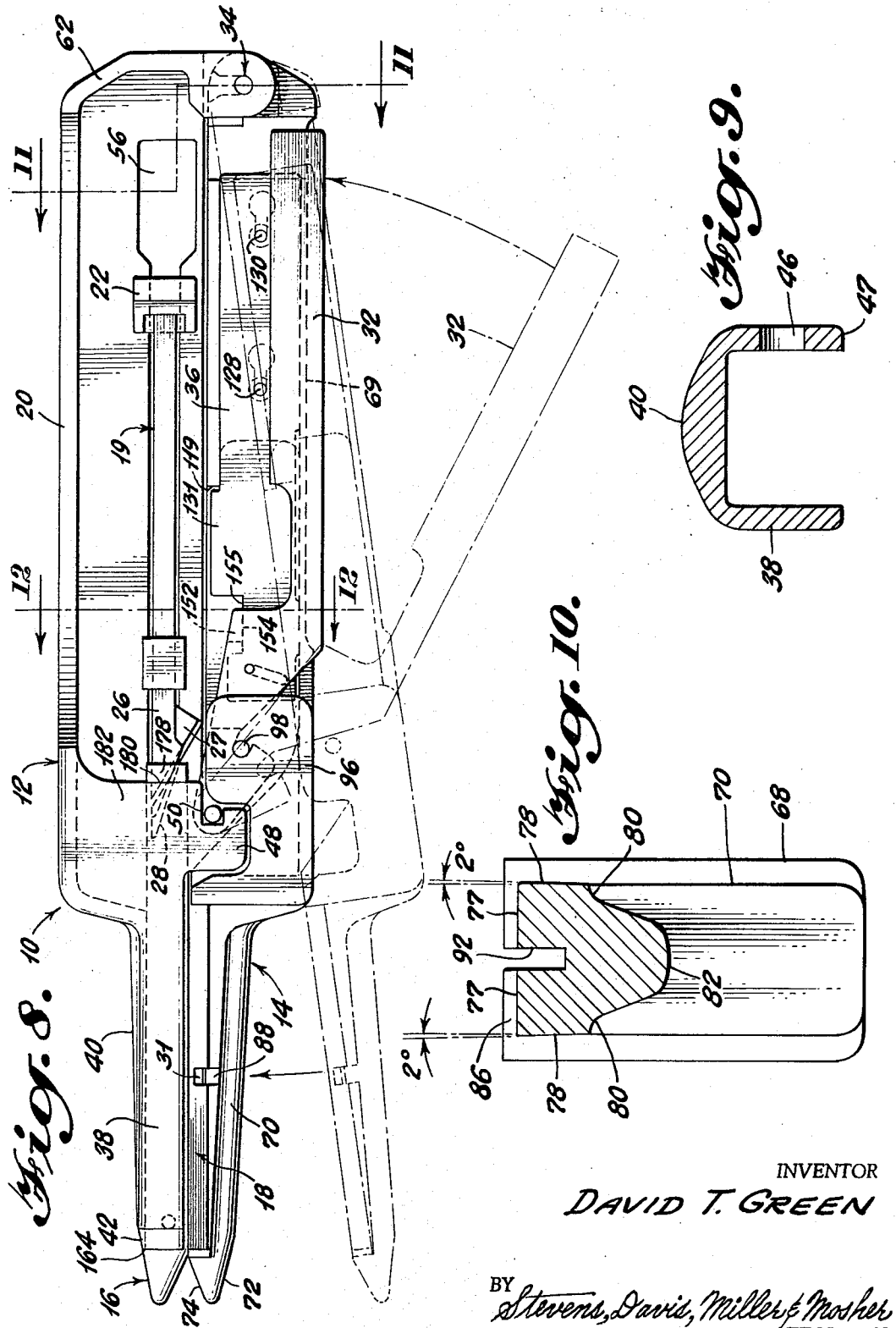

March 10, 1970 D. T. GREEN 3,499,591
INSTRUMENT FOR PLACING LATERAL GASTRO-INTESTINAL ANASTOMOSES
Filed June 23, 1967 9 Sheets-Sheet 4
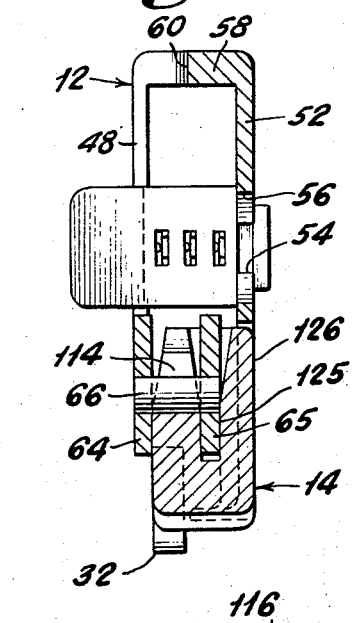
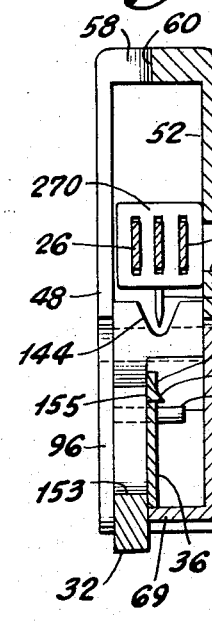
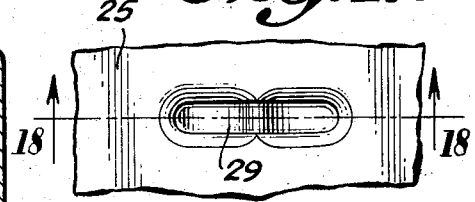
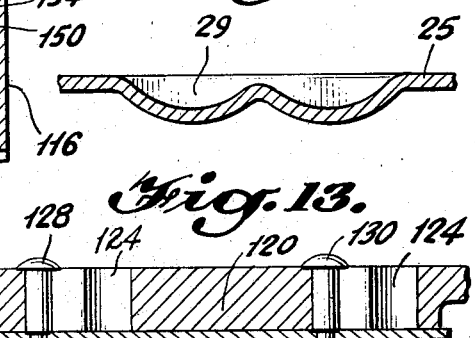
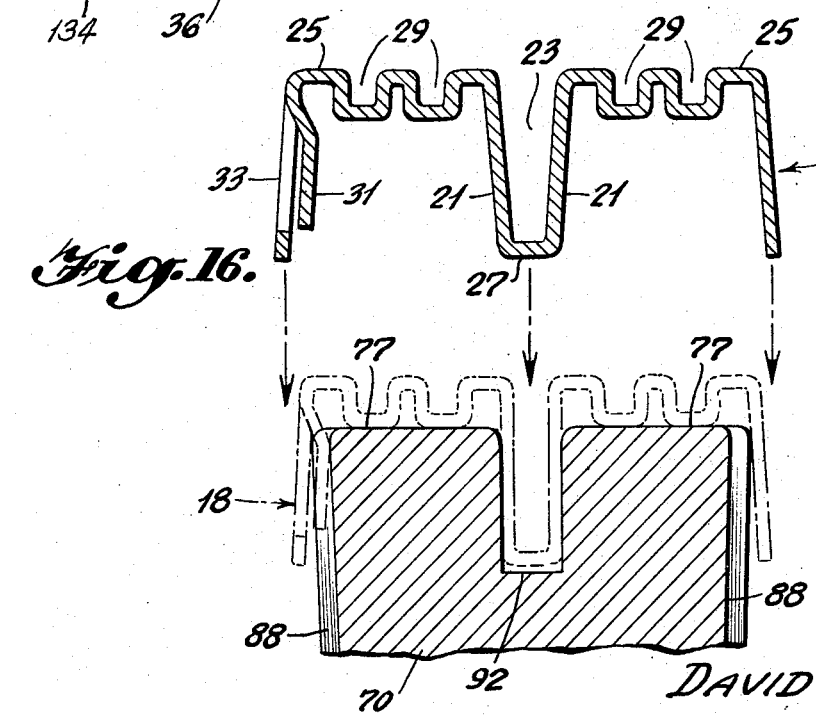
INVENTOR
DAVID T. GREEN
BY Stevens, Davis, Miller & Mosher
ATTORNEYS

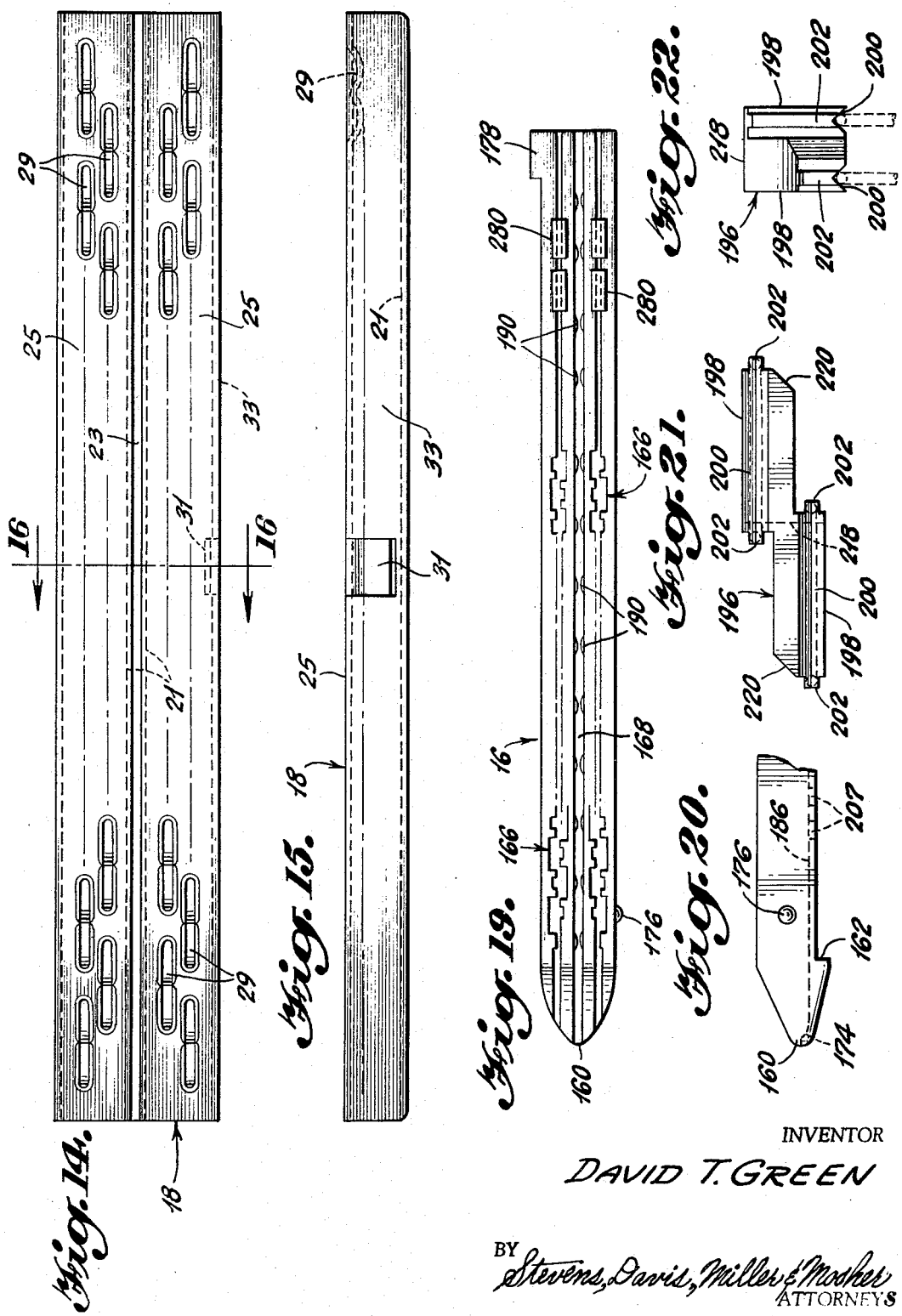

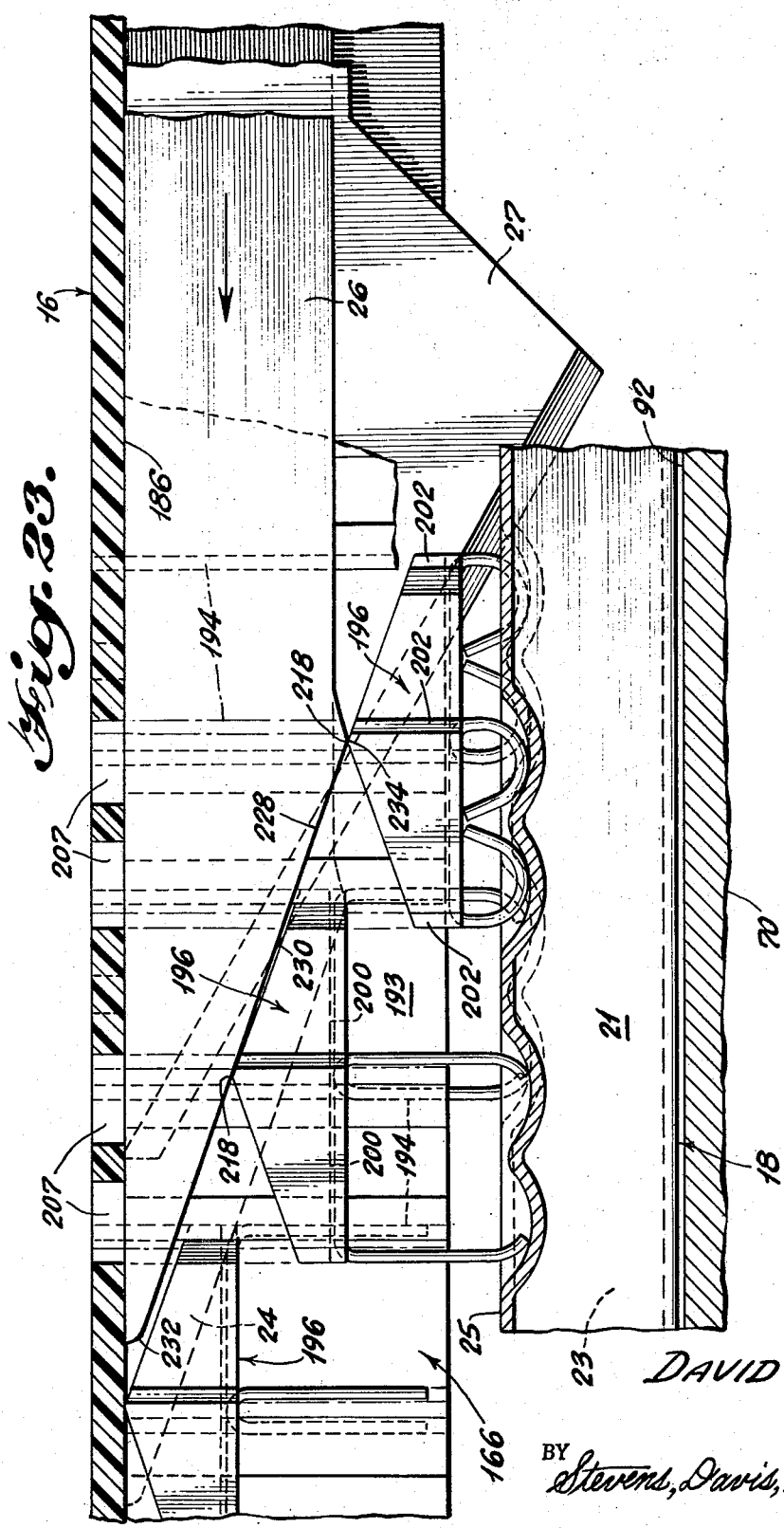

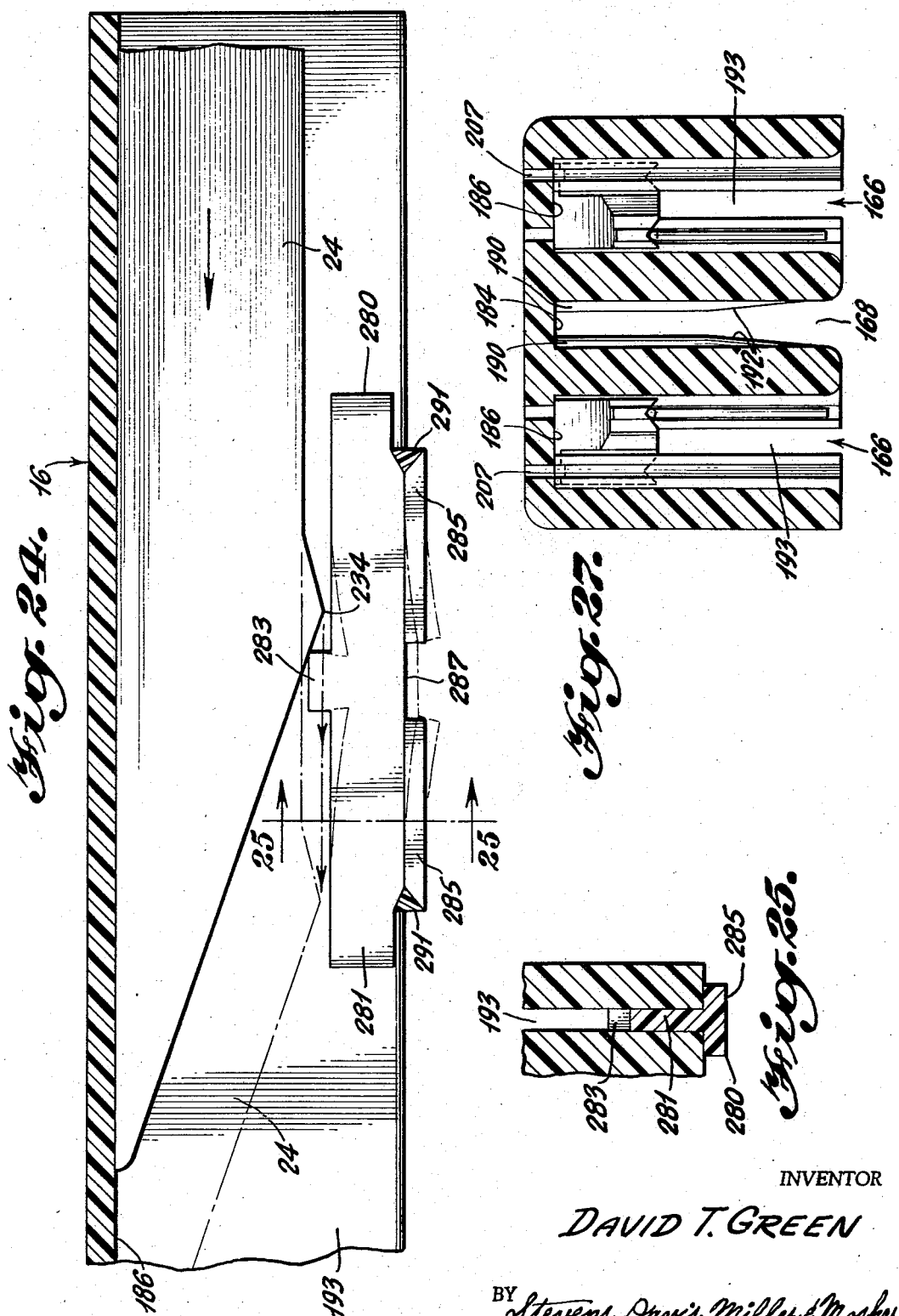

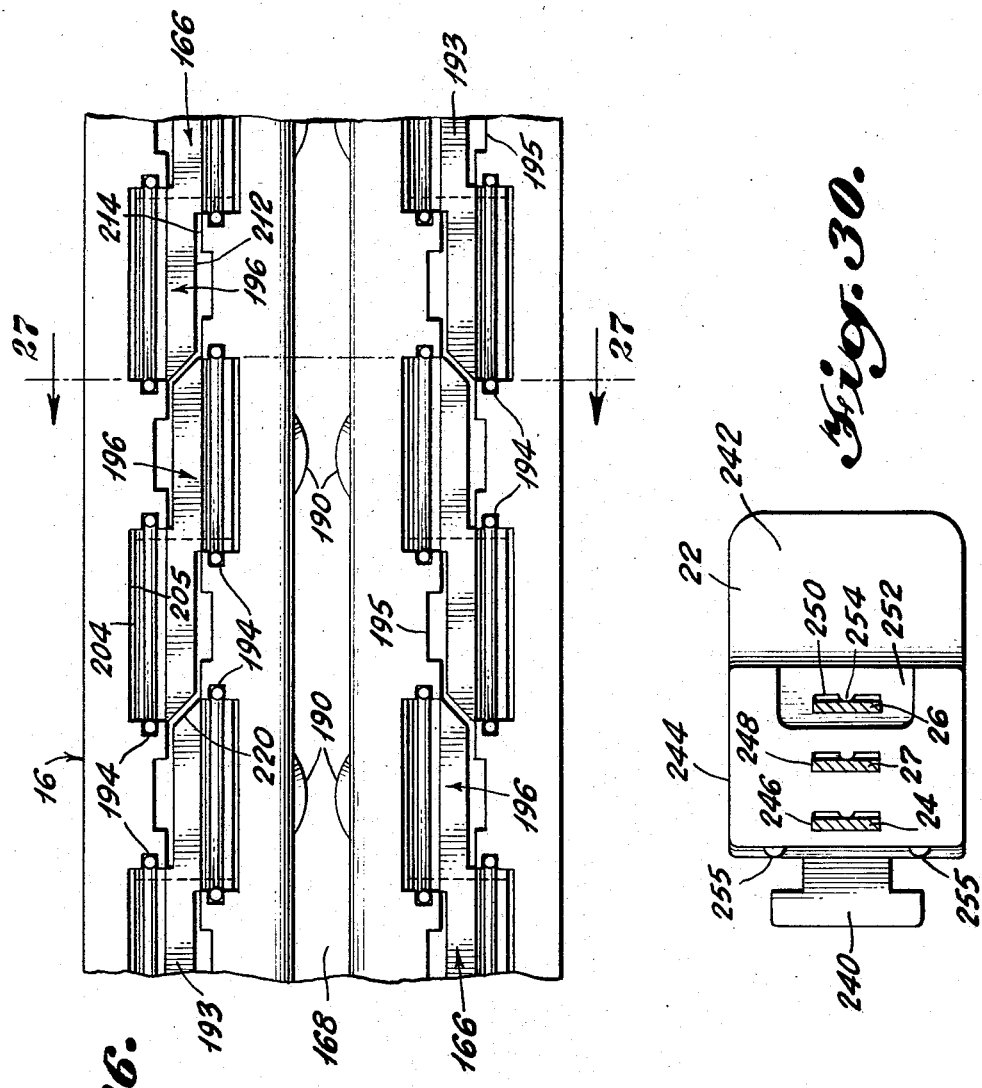

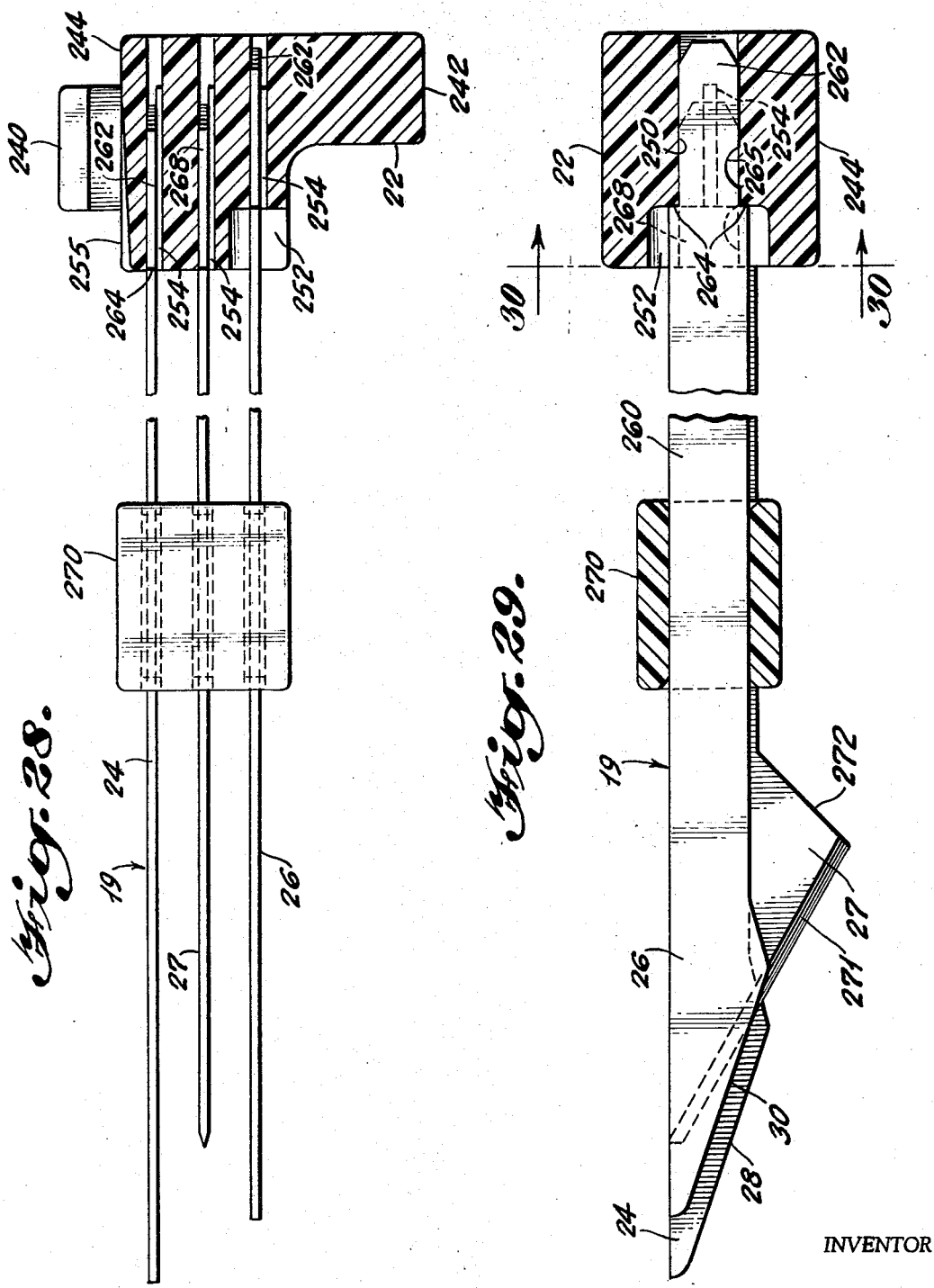

United States Patent Office 3,499,591
Patented Mar. 10, 1970

3,499,591
INSTRUMENT FOR PLACING LATERAL GASTROINTESTINAL ANASTOMOSES
David T. Green, Norwalk, Conn., assignor to United States Surgical Corporation, Baltimore, Md., a corporation of Maryland
Filed June 23, 1967, Ser. No. 648,276
Int. Cl. B25c; B27f 7/00
U.S. Cl. 227—76    20 Claims

ABSTRACT OF THE DISCLOSURE

An instrument for stapling and cutting gastro-intestinal organs having a plastic cartridge defining four rows of staple-carrying grooves. A pusher cam path divides associated pairs of rows and a plurality of plastic staple drive members are provided each bridging the path to ride in adjacent sets of grooves in opposite rows. A drive member part in the path is cammed to effect ejection. The staple-carrying grooves in corresponding pairs of rows are aligned but the pusher cams riding in paths are staggered to avoid simultaneous peak loads. The instrument includes an anvil mount with a central slot and the anvil has a central channel resiliently widened at its open end which is frictionally clamped under compression when it is pressed into the slot so as to laterally secure the anvil to the mount. A slotted spacer rides on the elongated pusher bars and knife to facilitate initial insertion thereof through the corresponding channels opening through the cartridge rear. The instrument lower frame includes a pair of side flanges in the midregion connected by a pin so as to strengthen the midregion and receive a notch hinge defined in the clamping and locking lever.

BACKGROUND

The present invention relates to improvements in surgical instruments, specifically staplers, for mechanically effecting a plurality of lateral lines of sutures or stitching staples in body organs.

With the advent of the general type of instrument disclosed in U.S. Patent No. 3,079,606 there began a general feeling in the medical profession that the time had come where technology should be able to produce an instrument for quickly and mechanically stitching together hollow organs. Although the development as disclosed in the aforementioned patent laid a basic foundation for a general design workable in theory, the medical profession did not quickly adopt such an instrument because of the lack of confidence in the reliability of the instrument generally brought about by instrument jamming, binding, and other unacceptable characteristics. Consequently, the effort continues to reevaluate, redesign and search for improved techniques and construction increasing and reliability of the instrument so that the surgeon has full confidence of its performance and capabilities.

To this end, improvements to the basic design now disclosed in U.S. patent application Ser. No. 585,672 filed Oct. 10, 1966, with common assignee, contribute greatly to the reliability of the instrument. It is a general purpose of the present invention to further increase the reliability of the instrument by providing a new and improved design of the cartridge and pusher assembly for the instrument of the type described. Specifically, the staple ejecting drive member is designed to bridge the gap between and ride within two adjacent sets of grooves in opposite parallel rows flanking the travel path of the pusher bar and has a cam-shaped bodyside opposite the recesses engaging the respective staple. In this way, as the pusher bar cam engages the cam surface of the drive member, there is a balancing of forces which tends to apply an unwanted torque to the drive member parts engaging the staples thus decreasing greatly the chance of binding between the drive member and the grooves or engaging guiding surfaces. This new drive member design also provides additional lateral strength for the cartridge internal walls.

Another feature of the invention is the provision of a knife and pusher bar spacer which maintains proper alignment and spacing for these members during initial insertion into the cartridge. Other improvements include features better facilitating the assembly of parts and operation thereof.

It is therefore a general purpose and object of the present invention to provide a new and improved instrument of the type described for achieving the advantages and benefits outlined above.

Other and further objects of the invention will become apparent with the following detailed description taken in view of the appended drawings in which:

FIGURE 2 is a bottom plan view of the upper jaw frame.

FIGURE 3 is a top plan view of the lower jaw frame.

FIGURE 4 is a top plan of the locking lever.

FIGURE 5 is a side elevation to an enlarged scale of the forward nose of the lever.

FIGURE 6 is an end elevation of the nose of the lever.

FIGURE 7 is a side elevation of the cartridge and pusher assembly.

FIGURE 8 is a side elevation of the assembled instrument.

FIGURE 9 is a transverse vertical section of the front projection of the upper jaw frame taken along line 9—9 of FIGURE 1.

FIGURE 10 is a vertical transverse section of the forward projection of the lower jaw frame taken along line 10—10 of FIGURE 1.

FIGURE 11 is a vertical transverse section taken along line 11—11 of FIGURE 8.

FIGURE 12 is a vertical transverse section taken along line 12—12 of FIGURE 8.

FIGURE 13 is a horizontal longitudinal section of a fragment of the lower jaw frame and the leaf spring.

FIGURE 14 is a top plan view of the anvil.

FIGURE 15 is a side elevation of the anvil.

FIGURE 16 is a cross section of the anvil taken along line 16—16 of FIGURE 14 with a phantom line showing of the anvil in place on the lower jaw frame.

FIGURE 17 is a top plan view to an enlarged scale of a fragment of the anvil showing a staple-shaping depression.

FIGURE 18 is a longitudinal section taken along line 18—18 of FIGURE 17.

FIGURE 19 is a bottom plan view of a disposable cartridge.

FIGURE 20 is a side elevation of the forward end of a cartridge.

FIGURE 21 is a bottom plan view of a staple-driving member.

FIGURE 22 is an end elevation of the member shown in FIGURE 21.

FIGURE 23 is a longitudinal vertical section through a cartridge showing the relationships of the drive member, pusher bars, knife and anvil.

FIGURE 24 is a vertical longitudinal section through a pusher bar groove of the cartridge showing a pusher bar retainer piece.

FIGURE 25 is a vertical transverse section along line 25—25 of FIGURE 24.

FIGURE 26 is a bottom plan view of a fragment of the cartridge.

FIGURE 27 is a vertical transverse sectional view along line 27—27 of FIGURE 26.

FIGURE 28 is a top plan view of a pusher assembly.

FIGURE 29 is a side elevation of the assembly shown in FIGURE 28.

FIGURE 30 is a cross section along line 30—30 of FIGURE 29.

GENERAL DESCRIPTION

Figure 1:
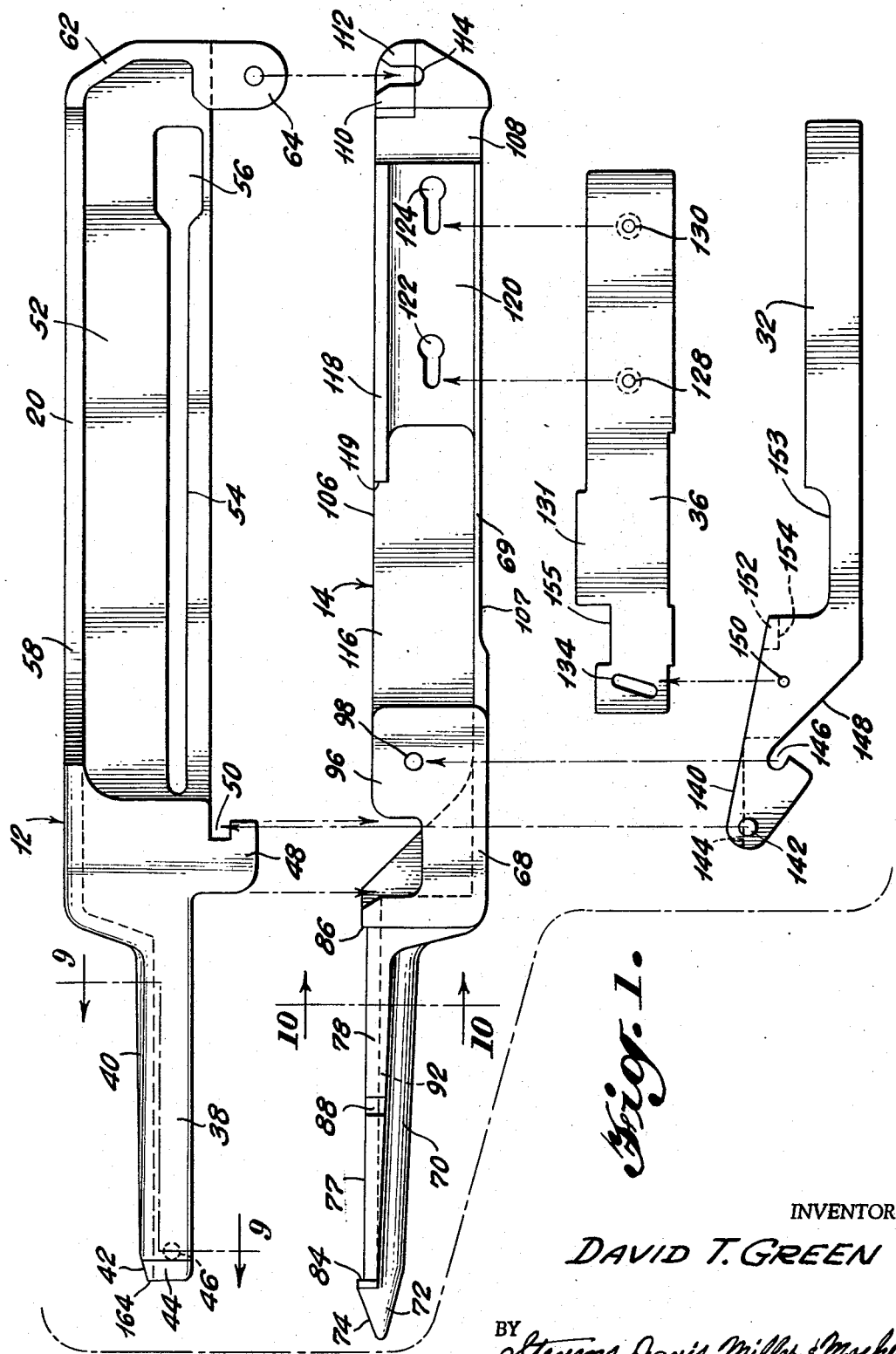
FIGURE 1 is a side elevation of the parts of the instrument disassembled.

With reference to the figures, an instrument 10 according to the invention includes an upper jaw frame 12 and a lower jaw frame 14 carrying respectively a disposable staple carrying and ejecting cartridge 16 and a disposable anvil 18 having a series of staple-closing depressions aligned with the plurality of staple-carrying slots of cartridge 16. Upper jaw frame 12 includes a handle 20 at the rear thereof which is hinged to the back of the lower jaw frame 14 so that the upper and lower jaw frames can be jackknifed together after the front projections are inserted into the organ. The organ is further clamped under pressure between the cartridge 16 and anvil 18 by the action of a locking lever 32 cooperating with upper and lower jaw frames 12 and 14 forceably bringing the two together about the hinged rear connection 34. Lever 32 is releasably locked in position by leaf spring 36 carried in the lower part of handle 20 and overriding a locking cam surface carried on the inside face of locking lever 32. A pusher assembly 19 carried by the handle 20 of the upper jaw frame includes an operating rear hand engageable part 22 securing a pair of staggered pusher bars 24 and 26 each having a cam 28 or 30 at the forward tip thereof and a center knife edge 27. The pushers and knife penetrate longitudinal slots of the cartridge and effectively eject staples and cut the clamped organ when the operating handle is driven forward.

DETAILED DESCRIPTION

Each of the above assemblies will now be described in detail. The upper jaw frame 12 is an elongated integral piece including a front projection 38 of inverted U-shape profile, all edges of which are rounded to prevent snagging and tearing of tissue. Projection 38 may have an elongated top dome 40 to strengthen the same in the vertical plane. The tops and sides of the tip are bevelled at 42 and 44 respectively. Circular opening 46 is defined in the lower front corner of projection leg 47 and functions to receive a cartridge locking bump or button as described below. In the midregion of jaw 12 a pair of depending ears 48 are provided which extend downward and to the rear to define slot 50 which cooperates with a hinge pin carried on the forward part of the locking lever 32.

The handle portion 20 of jaw 12 includes a side plate 52 extending the length of the handle 20 and defining an elongated slot 54 having a constant dimension throughout its forward length but expanding into an enlarged opening 56 at the rear. The axis of slot 54 and opening 56 are generally aligned with the vertical center of the open region within projection 38 and the center of opening 46. The upper part of handle 20 is covered over by a top flange 58 formed with an elongated cutout section 60 running substantially the full length of the handle. Removal of material to form recess 60 reduces the weight of the handle section of the instrument and permits more ready access to the pusher assembly when the instrument is assembled. A back flange 62 closes the back part of the handle from its top down to approximately the bottom of plate 52 and is formed integral with a pair of depending flanges 64 and 65 which are reamed through and carry a hinge pin 66 therebetween which is received by a slot at the back part of the lower jaw frame. Flange 65 is spaced inward from the plane of plate 52 for reasons mentioned below.

The lower jaw frame 14 is also an elongated integral piece having a central region 68 and a forward projection 70 for releasably securing a disposable anvil 18 in alignment with cartridge 16. All edges of projection 70 are rounded and a forward extending probe-like nose 72 is provided at the tip so that it can be worked into the organ. For this purpose the upper forward surface 74 extends upward and to the rear as well as laterally outward from the blunt point of nose 70. Behind surface 74, projection 70 has an enlarged and flat top surfaces 77 with upstanding outer sides 78 which may slope downward and inward, for example, at an angle of 2° to the vertical, and which forms a curved under surface 80. Side depressions 88 in the projection midregion receive a resilient lance on one of the depending anvil legs as described below. The bottom of projection 70 forms a deep and slightly narrowed reinforcement 82 which increases the vertical strength of the projection. Top ledges 84 and 86 near the front and rear of projection 70 together with side depressions 88 serve to longitudinally position the anvil when snapped in place.

Furthermore, since top surface 77 is recessed from the top of abutments 84 and 86, when the anvil is in place, all surfaces are smooth and no sharp corners are exposed. In order to accommodate the anvil center channel, an elongated slot 92 with generally rectangular profile is defined down the entire center of the projection and all the way out to the tip of nose 72.

The central portion 68 includes a botom flange 69 which extends continuously along the rear of jaw frame 14 and a pair of parallel outer upstanding side flanges 94 and 96 which are reamed through and receive a press fitted pin 98 which cooperates with the lock lever 32 and adds strength to the central region. Each side flange 94 and 96 is provided with an enlarged recess 97 and 99 with a forward and upward extending bevelled edge 101 and 103. Recesses 97 and 99 provide a space to receive the downward projecting ears 48 of the upper frame 12. A second pair of inner spaced flanges 100 and 102 are also provided to strengthen the central region and define a channel 104 wider than and axially aligned with channel 92.

The lower jaw handle 106 is formed by a side plate 116 running the length thereof and a top flange 118 the inside surface of which locates the leaf spring. Just beneath top flange 118 a thickened region 120 is formed and provided with a pair of aligned key slots 122 and 124. Region 120 serves to locate and seat the elongated leaf spring 36.

Handle section 106 shares the same bottom flange 69 as the center portion 68; however, the bottom flange 69 is narrowed in handle 106 and terminates at the upstanding recess 108. Bottom flange 69 also has a recessed surface 107 to facilitate clamping and locking of lever 32. The rear extremity of frame 14 is enlarged and includes upstanding projections 110 and 112 defining a cradle slot 114 receiving the hinge pin 66 of frame 12.

A slot 125 is formed in the top of the rear enlargement such that the rear part 126 has a thickness equal to the displacement of ear 65 from side plate 52 and the thicknesses of the bases of projections 110 and 112 are equal to the spaces between ears 65 and 64 so that when the instrument is assembled, as seen in FIGURE 11, the handle section has a generally uniform thickness.

Leaf spring 36 is formed by an elongated piece of thin steel of suitable strength and resiliency carrying a pair of spaced and aligned rivets 128 and 130 which seat in key slots 122 and 124. Tab 131 abuts edge 119 of flange 118 to retain the rivets in slots 122 and 124.

To assemble the top and bottom frames, spring 36 is attached to the lower jaw frame 14 by seating rivets 128 and 130 in key slots 122 and 124 respectively. In this position the leaf spring 36 free end projects forward to a general position shown in FIGURE 13 so as to move generally perpendicular to its plane in response to exerted pressure. As mentioned above, locking lever 32 in cooperation with leaf spring 36 serves to clamp and lock jaws 12 and 14 in operating engagement. For this purpose locking lever 32 includes an upwardly inclined forward section 140 carrying a pin 142 projecting from both sides thereof and having a clearance groove 144 defined along its top and through pin 142. The projecting extremities of pin 142 seat within slots 50 of ears 48 on the upper frame 12 and clearance groove 144 serves to provide clearance space for the thrust of knife 27. The lower rear of part of section 140 is provided with slot 146 having one edge continuous with a guide surface 148 which engages and guides pin 98 on frame 14 and guides the same into slot 146 for full seating. When seating lever 32 on the lower frame 14, spring 36 is depressed and then released so that slot 134 receives the transverse pin 150 carried by lever 32. Slot 134 and pin 150 cooperate to retain pin 98 in slot 146 while at the same time permitting resilient deformation of the forward part of the spring. An inclined locking cam 152 carried by the lever 32 has a downward sloping surface directed toward spring 36 and terminating in a lower flat horizontal surface 154 which when the locking lever 32 is rotated to the horizontal overrides edge 155 of spring 36 permitting the latter to snap back to its straight or normal position so as to block the lowering of lever 32. In order to release the locking action, tab 131 on spring 36 is manually depressed to move edge 155 free of surface 154. Lever relief 153 facilitates manual depression of tab 131.

Before describing the disposable cartridge and pusher assembly, reference is made to FIGURE 16 showing the anvil 18 having an inverted double U profile with the contiguous legs 21 connected to form a channel 23 through which the knife blade passes. The top sections 25 of the anvil 18 are each provided with a pair of rows of staple-shaping depressions 29 having the same disposition and pattern as the open ends of the staple-carrying grooves in the cartridge. Depressions 29 are further disclosed in said aforementioned patent application. In order to laterally position and secure anvil 18 on projection 70, center legs 21 extend slightly outward and away from the connecting piece 27 to a width slightly greater than the width of slot 92 on projection 70. Due to the spring-like resiliency of legs 21, when channel 23 is seated fully into slot 92, legs 21 are forced toward each other and remain under compression to frictionally fit and precisely seat the anvil in the lateral direction. Accurate vertical anvil positioning is achieved by the bottom plane of depression 29 engaging surfaces 77 of projection 70. Anvil 18 is longitudinally located and secured by lancing 31 provided at the center region of anvil leg 33. Depending upon how anvil 18 is turned when seated, lancing 31 snaps into one of the depressions 88. Therefore, with anvil 18 held by channel 23 and critically aligned by lancing 31, anvil 18 is securely but releasably held on the lower frame 14.

The disposable cartridge and pusher assembly includes cartridge 16 made of Lexan or other suitable disposable, surgically approved material having an elongated body with a forward tapered but rounded nose 160 and an upper back ledge 162 which abuts the top forward surface 164 of projection 38 of the top frame 12. A rounded bump 176 is formed at one side of cartridge 16 so as to resiliently snap into opening 46 on leg 47 of projection 38. At the rear of cartridge 16 on the opposite side from bump 176 there is formed a projection 178 which assists the alignment and seating of cartridge 16 in the upper jaw 12 by abutting against the vertical surface 180 of flange 182 in the midregion of jaw 12. Cartridge 16 is formed with four parallel rows of cartridge-carrying grooves generally indicated as 166 and a central knife-guiding through slot 168 each of which opens through the bottom 170 of the cartridge. As evident from the drawings, the rows 166 cooperate in pairs to define a longitudinal path for one of the pusher bars which penetrates cartridge 16 from the rear. Through slot 168 has a top surface which in the forward region of nose 160 terminates in a depending curved part 174 to fair the forward nose tip.

The inner tops or closing surfaces 184 and 186 of slot 168 and rows 166 should be as smooth as possible without protrusions or depressions so as to provide a smooth surface against which the tops of pusher bars 24, 26 and knife 27 can ride.

A plurality of pairs of bumps 190 are provided in knife slot 168 and extend with a constant dimension from surface 184 toward the exposed part of slot 168 to about its midheight at which point it then tapers at 192 toward the side walls of the slot. Bumps 190 have rounded profiles and are spaced from the cooperating bump so as to laterally confine the travel path of the knife through slot 168. The longitudinal spacing of bumps 190 should therefore be suitable to effect this result.

As seen in FIGURES 19, 23, 26 and 27, the cooperating pair of parallel drive member and staple-carrying rows 166 are spaced laterally from each other a constant distance to define a pusher bar travel path 193 and it is evident from the drawings that the staples are arranged in staggered overlapping relationship contiguous to path 193. But for reasons made clear below, the outermost staple grooves are transversely aligned and the innermost staple grooves are transversely aligned. Grooves 194 are aligned and dimensioned to carry and guide the parallel legs of each staple. Each drive member 196 is an integral Lexan piece having two drive sections 198 each positioned behind the cross leg of contiguous staples on the opposite sides of path 193. Each section 198 includes a recess 200 which cups the cross leg of the staple and a pair of longitudinally extending protrusions 202 which ride in grooves 194 to provide the principal guiding action for the section. Face 204 is parallel with and slightly spaced from cartridge surface 205. Through slots 207 occur in the cartridge top surface for tooling reasons. Drive member face 212 is also parallel to and slightly spaced from cartridge surfaces 214 which form the boundaries of path 193. Slots 195 are formed to provide space for any gate remaining on the drive member. As seen in FIGURE 21, sections 198 overlap in the longitudinal direction and are integrally joined in the overlapping region. The side of drive member 196 opposite recesses 200 slopes in two directions toward the apex 218 to form a cam line to cooperate with the pusher bar cam. The side edges 220 are bevelled so as not to interfere with the action of the adjacent drive member 196. It will be understood that the sections 198 are laterally connected and, therefore, reinforce the associated walls of the cartridge.

During manufacture of cartridge 16, a pair of plastic T-pieces 280 are fitted into the pusher grooves 193 at a region slightly forward of the rear of the cartridge and secured therein by heat sealing the same. Pieces 280 serve to provide some (preferably slight) friction against inadvertent pusher bar penetration but which is overridden during intended operation of the pusher assembly. An additional function for pieces 280 is to prevent pusher bar cams from displacing excessively away from surfaces 186 so that the forward tip of the cam is assured of properly striking the cam surface of all associated drive members 196.

As seen in FIGURE 24, each piece includes a body 281 with a center projection 283 which when seated faces the pusher bar during ejection. A pair of flat heads 285 separated by a notch 287 are integral with body 281 and lie flat on the cartridge bottom surface as shown. Notch 287 permits slight bowing in the vertical plane when point 234 of the pusher cam passes projection 283. Notches 291 facilitate the heat sealing step.

The ejection action can best be seen in FIGURE 23. The pusher cam 228 has a forward sloping cam surface 230 at a slightly less angle to the horizontal than the slope of the cam surface on the drive member. As the pusher bar is advanced, pusher cam 228 is precisely guided (but with substantially no friction resistance) by the surfaces defining path 193 including surface 186 in cooperation with T-piece 280. The rounded forward nose 232 of the pusher cam engages the drive member cam to start the ejection action by forcing the drive member 196 along the vertical grooves and surfaces toward the anvil. As the pusher bar continues to advance, apex 218 rides on to surface 230 which in view of this line-to-surface sliding contact continues to apply force in the ejection direction. By virtue of the symmetrical arrangement of sections 198 of the drive member, two staples are simultaneously ejected and, in this way, only balanced moments are developed about the drive member apex 218 so as to prevent turning or skewing of the drive member both in the transverse and longitudinal planes. As the pusher bar continues to advance, the protruding staple legs penetrate the tissue, contact the anvil depressions and are turned under as shown. As the action continues, the lowest point 234 of the pusher bar passes beyond apex 218 of the drive member thus stopping the ejection action for that member. The dimensions of the drive member and cooperating cartridge grooves are such that the drive members are frictionally held in the cartridge after ejection so that no other means need be provided to prevent drive member fall out.

The pusher assembly 19 includes a Lexan pusher bar handle 22 provided with a T-shaped extension 240 which is inserted through opening 56 and rides in slot 54 of the upper frame 12 and a pair of spaced ridges 255 which prevent vertical rocking and reduce friction by sliding on plate 52. A pusher bar handle tab 242 projects from the handleside opposite from T-projection 240. The main body 244 of handle 22 is of greater thickness than the pusher bar handle and is provided with three parallel slots 246, 248 and 250 opening through the front and back surfaces of handle 22. A generally rectangular relief 252 is formed in the front left part of handle body 244 and intersects slot 250. The purpose of relief 252 is to position the pusher bar received in slot 250 slightly to the rear of the pusher bar received in slot 246. Each of the three slots in handle 22 is provided with a rounded protrusion 254 extending from the side wall thereof. As seen in FIGURE 28, protrusions 254 extend only in the forward portion of each respective slot and terminate on alignment with the back face of T-projection 240.

As seen in FIGURE 28, a pair of pusher bars 24 and 26 are seated in slots 246 and 250 respectively and are tightly held therein by protrusions 254. Each pusher bar is stainless steel and formed as an elongated piece having a central region 260 of generally rectangular configuration and a rear anchor 262 of less vertical dimension than region 260 to form a pair of abutments 264 which engage the front face of handle body 244 or the relief surface 252. The upper and lower back edges of anchor 262 are bevelled and a semi-circular notch 265 is provided on the same side of the anchor as the forward pusher cam 228. If further locking is necessary or desired, the body 244 can be cold staked to deposit material in notches 265.

Knife 27 is similarly shaped as the pusher bars and also includes a bevelled and notched anchor 268 at its rear tightly held in the center slot by protrusion 254. Blade 270 is honed to suitable sharpness and can have any suitable shape. But in this example, it is shown with an inclined forward edge terminating in a flat rearward sloping edge 272. As seen in FIGURE 29, the length of the knife 27 is such that upon assembly the cutting edge 271 is located slightly behind the cam surface of pusher bars 24 and 26.

Spacer 270 with parallel through slots is fitted over the pusher and knife members during the manufacturing of the assembly. The openings of the slots in spacer 270 are flared or bevelled and each slot has a dimension slightly larger than the member which it receives. The purpose of spacer 270 is to facilitate the insertion of the pusher and knife members into the respective cartridge slot. To this end, spacer 270 is brought forward keeping the forward ends of the members in proper spacing until insertion is effected. After this insertion, spacer 270 can ride anywhere along the members without attention.

OPERATION OF THE INSTRUMENT

Initially, leaf spring 36 is secured to the lower frame 14 and the key slots 122 and 124 and the locking lever 32 is hinged to the lower frame by means of seating slot 146 over pin 98 and snapping pin 150 into penetrating engagement with slot 134 of spring 36 in order to secure the same.

For convenience and safety, the disposable cartridge is initially fully loaded and assembled and preferably packaged with the anvil 18. To assemble, cartridge 16 is attached to upper frame 12 projection 38 and anvil 18 is secured to projection 70. Spacer 270 is brought forward and the pusher cams and knife edge are inserted in the cartridge. The operating handle 22 is then inserted through enlarged upper frame side plate opening 56 and guided on to slot 54 to complete the individual assembly of the upper and lower frames.

At the time of use, jaws 12 and 14 are hinged together at the back by fitting pin 66 of the upper frame into slot cradle 114 in the lower frame. Jaws 12 and 14 are then rotated together until they are spaced slightly apart and lever 32 is worked to fit pin 142 into slot 50 of the upper frame. At this point the surgeon inserts the forward projections of the instrument into the organ to be stitched and, when properly aligned in position, pulls back on handle 32 to its horizontal or locked position so as to increase the clamping pressure between the cartridge 16 and anvil 18. As lever 32 is brought flush with the back part of the handle, the locking cam carried thereby overrides the edge 155 of spring 36 so as to lock the assembly together.

The instrument is now ready for ejection of the staples.

In order to effect ejection, forward pressure is applied to handle 22 driving the pusher bars 24 and 26 beyond T-pieces 280 and forward together with knife 27 thus effecting successive ejection of all staples as described and a clean and efficient cut down the center of the four parallel staple rows. With the drive members 196 (transversely aligned) and the cam sections of the pusher bars suitably staggered, peak resistance forces are encountered alternately by the pusher bars but never at the same time by both pusher bars. After ejection, the operating handle 22 is withdrawn rearward, lever 32 is released by depressing the tab 133 of spring 36, and the instrument forward projections 38 and 70 are separated slightly and withdrawn from the organ. Disposable cartridge unit 16 and pusher assembly together with the anvil may be discarded as desired and the instrument is ready to receive another such assembly and anvil with or without the disassembly of lever 32, spring 36 and the upper and lower frames 12 and 14.

It will be understood that various modifications can be made to the herein disclosed example of the present invention without departing from the spirit and scope thereof.

What is claimed is:

1. A cartridge assembly for a surgical stapler having an elongated cartridge with a tissue engaging surface, two sets of staple-carrying grooves each adapted to carry a staple with its free ends projecting toward said surface, each set being aligned in the longitudinal direction, said sets being separated by a guide path for guiding an ejection effecting cam member, each set of staple-carrying grooves being open to said path and extending to said surface, and an integral drive member positioned on the opposite side of the staples from said surface having two drive sections guided by the cartridge to ride within the planes of the staple-carrying grooves in opposite ones of said sets and having means disposed in said path to be engaged by the cam member to effect movement of the drive member toward said surface and thereby to effect simultaneous ejection of the two staples.

2. A cartridge assembly as set forth in claim 1 wherein said sets are longitudinally staggered and said last-mentioned means includes a cam symmetrically positioned in the longitudinal direction relative to the two drive sections so that forces opposing staple ejection are balanced about said cam.

3. A cartridge assembly as set forth in claim 2 wherein said two sections have corresponding parts extending equally from an imaginary center plane defined along said path and intersecting said surface, and said staple-carrying sets of grooves being equidistant from said center plane in opposite transverse directions therefrom.

4. A cartridge assmebly as set forth in claim 2 wherein a said cam is formed by sloping surfaces on the drive member side opposite said surface which intersect to form a cam line.

5. A cartridge assembly as set forth in claim 2 wherein each of said drive member sections includes a recess to cup the staple cross leg and a pair of guiding projections riding in the associated set of staple-carrying grooves.

6. In combination with the cartridge assembly as set forth in claim 2 wherein said cartridge has a closing surface for the side of said path opposite said tissue-engaging surface, an elongated pusher bar having a front cam penetrating the path from the rear, said cam having a forward nose and a sloping cam surface, said cam nose normally riding near said closing surface so that the cam sloping surface extends away from the closing surface, interfering means secured to the cartridge rearward of said sets and near said surface and projecting into said path for releasably resisting the forward advance of the pusher bar by engaging the same but releasing the same for forward movement therebeyond when a forward thrust greater than a set minimum is applied to the pusher bar and having means to hold the cam nose of the pusher bar to within a set distance from said closing surface during forward pusher bar movement to assure that the cam nose makes initial contact with the drive member at the operating part of the cam thereof.

7. The combination as set forth in claim 6 wherein said interfering means includes a T-piece with a pair of enlarged heads divided by a groove lying flat on said surface with an elongated body extending from said heads into the path and being secured at both ends to the cartridge parts forming the path and provided with a projection opposite said T-piece groove extending further into said path to releasably and guidingly contact the pusher bar.

8. A cartridge assembly as set forth in claim 2 wherein the cartridge is provided with a slot communicating with the path and formed in the wall opposite each set of staple-carrying grooves to permit a noninterfering space for a gate left on the associated section of the drive member.

9. A cartridge assembly as set forth in claim 2 wherein a plurality of such sets are provided divided by the path and longitudinally aligned to form a pair of parallel and aligned rows of sets, the sets of one row being staggered and overlapping in the longitudinal direction the sets of the other, and a plurality of such drive members carried by cooperating sets, the front and back edges of each drive member being spaced from adjacent drive members so as not to interfere with the adjacent drive members.

10. A surgical stapling instrument comprising an upper frame and a lower frame, the upper frame having a forward finger-like cartridge-carrying projection and the lower frame having a forward finger-like anvil-carrying projection, said anvil-carrying projection having a pair of top surfaces divided by an elongated slot extending generally down the longitudinal centerline of the anvil-carrying projection, and an elongated anvil having two generally coplaner top surfaces provided with a plurality of staple-shaping depressions are divided by an elongated central channel extending downward from the contiguous edges of said top surfaces and said channel being inserted in the slot in said surface of the anvil-carrying projection when the anvil is mounted thereto, the outer width of at least the upper portion of said channel being slightly greater than that of the upper portion of said slot so that the walls of said channel are compressed together so that the anvil is precisely laterally aligned and frictionally secured against relative lateral movement.

11. An instrument as set forth in claim 10 wherein the upper surface of said anvil-carrying projection engages the anvil at the lower bottom plane of the plurality of depressions in order to vertically locate the same.

12. An instrument as set forth in claim 10 wherein the anvil is provided with at least one depending side leg extending the length of the anvil and projecting along a side wall of the anvil-carrying projection, said side wall and side leg provided with releasable engageable means to precisely locate the anvil in the longitudinal direction.

13. A surgical stapling instrument comprising an upper frame and a lower frame hinged thereto, the upper frame having a forward finger-like cartridge-carrying projection and the lower frame having a forward finger-like anvil-carrying projection, said cartridge-carrying projection having an inverted U-shaped profile, and the upper frame having a midregion provided with a side flange portion aligned within the plane of one of the depending legs of the cartridge-carrying projection and having a back surface, a cartridge held on the upper frame comprising a forward probe-like nose having a back abutment contacting the front of the cartridge-carrying projection, a cartridge body extending from the nose through the inverted U-shaped profile of the cartridge-carrying projection, and a back flange abutting the back surface of said side flange in order to precisely position and secure the cartridge on the upper frame, and cartridge retaining means provided at the forward parts of the cartridge body and cartridge-carrying projection for releasably and further securing the cartridge thereto.

14. A surgical stapling instrument comprising an upper frame and a lower frame hinged thereto, the upper frame having a forward finger-like cartridge-carrying projection and the lower frame having a forward finger-like anvil-carrying projection, a cartridge assembly secured to said cartridge-carrying projection and defining along its length a pair of parallel and laterally spaced pusher bar guide paths and a knife blade guide path parallel with and intermediate said pusher bar guide paths, said paths opening through the back end of said cartridge assembly, said upper frame further including an elongated handle portion at the rear thereof, said handle portion including means defining a handle guide slot extending generally parallel to said pusher bar and knife guide paths, a pusher assembly including an operating handle, a pair of elongated pusher bars secured in said operating handle and projecting forward therefrom and an elongated knife member having a cutting edge at the forward tip thereof also secured in said operating handle and projecting forward therefrom, said pusher bars and knife member being generally parallel and laterally spaced in corresponding distances with the associated paths in said cartridge assembly, a spacer member defining three parallel through slots each of which freely rides on one of said elongated pusher bars and knife member for being manually moved forward toward the front parts thereof to hold the proper alignment of said pusher bars and knife member to facilitate insertion thereof into the back opening of the corresponding paths in said cartridge, said operating handle including guide means which ride in said guide slots to guide the handle during the forward actuating movement thereof.

15. A surgical stapling instrument comprising an upper frame having a midregion, a finger-like cartridge-carrying projection extending forward of the midregion and an elongated handle portion extending rearward of the midregion, an elongated cartridge secured to said cartridge-carrying projection and having a pair of longitudinally extending transversely spaced parallel pusher bar guide paths opening through the back of the cartridge and a longitudinal knife member guide path intermediate of and parallel with said pusher bar guide paths and also opening through the rear of the cartridge, at least one row of staple-carrying grooves disposed along each of said guide paths, each pair of grooves extending generally perpendicular to the direction of the pusher bar guide paths, said cartridge further carrying a plurality of staple drive members each associated with at least one pair of staple-carrying grooves and being guided by the cartridge to drive the associated staple along said staple-carrying grooves, each drive member having a cam portion extending into the associated pusher bar path, a pusher assembly including a pair of elongate pusher bars and an elongate knife member disposed between said pusher bars, each said pusher bars having a cam surface at the forward tip thereof for cooperative engagement with said cam portion of said drive members, operating handle means securing the rear ends of said elongate pusher bars and knife member, the forward parts of said pusher bars and knife member penetrating the respective paths in said cartridge, said handle portion and operating handle means including guide means for guiding the operating handle generally parallel to said paths during ejection, the longitudinal relationships of each corresponding pairs of staple-carrying grooves being related to the longitudinal relationships of the pusher bar cam surfaces such that the peak staple ejection resistive forces encountered by the one pusher bar occur before or after but not during the time such forces are encountered by the other pusher bar.

16. A surgical stapling instrument as set forth in claim 15 wherein corresponding pairs of staple-carrying grooves associated with opposite pusher bar paths are transversely aligned and the cam surfaces of said pusher bars are staggered a predetermined distance in the longitudinal direction.

17. A surgical stapling instrument as set forth in claim 16 wherein said knife edges disposed rearward of the rearmost pusher bar cam surface.

18. A surgical stapling instrument as set forth in claim 16 wherein said operating handle includes a body part provided with three parallel through slots each with a friction-engaging means to frictionally secure the back end of the respective pusher bar or knife member therein, said body part defining a relief surrounding the forward part of one of the slots seating a pusher bar so that the slot terminates at a transverse surface which is rearward of the forward open end of the other slot seating the other pusher bar, each said pusher bar having a narrowed anchor seated in the respective slot and at least one abutment which contacts the respective forward surface of the body member so that notwithstanding the equal lengths of the pusher bars, the cam surfaces thereof are staggered in the longitudinal direction.

19. A surgical stapling instrument as set forth in claim 14 wherein said operating handle guide means includes a T-shaped projection extending from the side of said operating handle and an elongated slot defined in the upper frame handle having an enlargement at the rear thereof to facilitate insertion of said T-shaped projection and an elongated narrowed portion for guiding the operating handle during its forward movement.

20. A cartridge assembly as set forth in claim 1 wherein the cartridge is plastic, the drive member is plastic and the staple is stainless steel.

References Cited
UNITED STATES PATENTS

| | | | |
|---|---|---|---|
| 3,079,606 | 3/1963 | Bobrov et al. | 227—152 XR |
| 3,252,643 | 5/1966 | Strekopytov et al | 227—152 XR |
| 3,315,863 | 4/1967 | O'Dea | 227—19 |
| 3,317,105 | 5/1967 | Astafjev et al. | 227—76 |

GRANVILLE Y. CUSTER, JR., Primary Examiner

U.S. Cl. X.R.

227—19

REEXAMINATION CERTIFICATE (918th)
United States Patent [19]
Green

[11] B1 3,499,591
[45] Certificate Issued  Sep. 20, 1988

[54] INSTRUMENT FOR PLACING LATERAL GASTRO-INTESTINAL ANASTOMOSES

[75] Inventor: David T. Green, Norwalk, Conn.

[73] Assignee: United States Surgical Corporation, Baltimore, Md.

Reexamination Request:
No. 90/001,192, Mar. 12, 1987

Reexamination Certificate for:
Patent No.: 3,499,591
Issued: Mar. 10, 1970
Appl. No.: 648,276
Filed: Jun. 23, 1967

[51] Int. Cl.⁴ .................. B25C 7/00; B27F 7/00; A61B 17/00
[52] U.S. Cl. .................. 227/76; 227/19; 227/DIG. 1; D24/26
[58] Field of Search .......... 227/19, 76, 152, DIG. 1

[56] References Cited

U.S. PATENT DOCUMENTS

| | | | |
|---|---|---|---|
| 960,300 | 6/1910 | Fischer . | |
| 2,344,071 | 3/1944 | Wilson et al. | 1/49.1 |
| 3,079,606 | 3/1963 | Bobrov et al. | 1/120 |
| 3,144,654 | 8/1964 | Mallina et al. | 1/50 |
| 3,224,083 | 12/1965 | Tipper | 29/243.57 |
| 3,252,643 | 5/1966 | Strekopytov et al. | 227/109 |
| 3,315,863 | 4/1967 | O'Dea | 227/19 |
| 3,317,105 | 5/1967 | Astafjev et al. | 227/76 |
| 3,490,675 | 1/1970 | Green et al. | 227/19 |
| 3,499,591 | 3/1970 | Green | 227/76 |

FOREIGN PATENT DOCUMENTS

406832  3/1923  Fed. Rep. of Germany .

OTHER PUBLICATIONS

Dr. M. Tomoda, New Gastro-Intestinal Suturing Apparatus.
Dr. Sandor Istven, The Hultl Type Metal Stapling of Intestines and the Description of a New Stapling Device.
Dr. Willy Meyer, Extrathoracic and Intrathoracic Esophagoplasty in Connection with Resection of the Thoracic Portion of the Esophagus for Carcinoma, Jour. A.M.A., Jan. 10, 1914.
Dr. Felicien M. Steichen, Stapling in Surgery, 1910.

*Primary Examiner*—Paul A. Bell

[57] ABSTRACT

An instrument for stapling and cutting gastro-intestinal organs having a plastic cartridge defining four rows of staple-carrying grooves. A pusher cam path divides associated pairs of rows and a plurality of plastic staple drive members are provided each bridging the path to ride in adjacent sets of grooves in opposite rows. A drive member part in the path is cammed to effect ejection. The staple-carrying grooves in corresponding pairs of rows are aligned but the pusher cams riding in paths are staggered to avoid simultaneous peak loads. The instrument includes an anvil mount with a central slot and the anvil has a central channel resiliently widened at its open end which is frictionally clamped under compression when it is pressed into the slot so as to laterally secure the anvil to the mount. A slotted spacer rides on the elongated pusher bars and knife to facilitate initial insertion thereof through the corresponding channels opening through the cartridge rear. The instrument lower frame includes a pair of side flanges in the midregion connected by a pin so as to strengthen the midregion and receive a notch hinge defined in the clamping and locking lever.

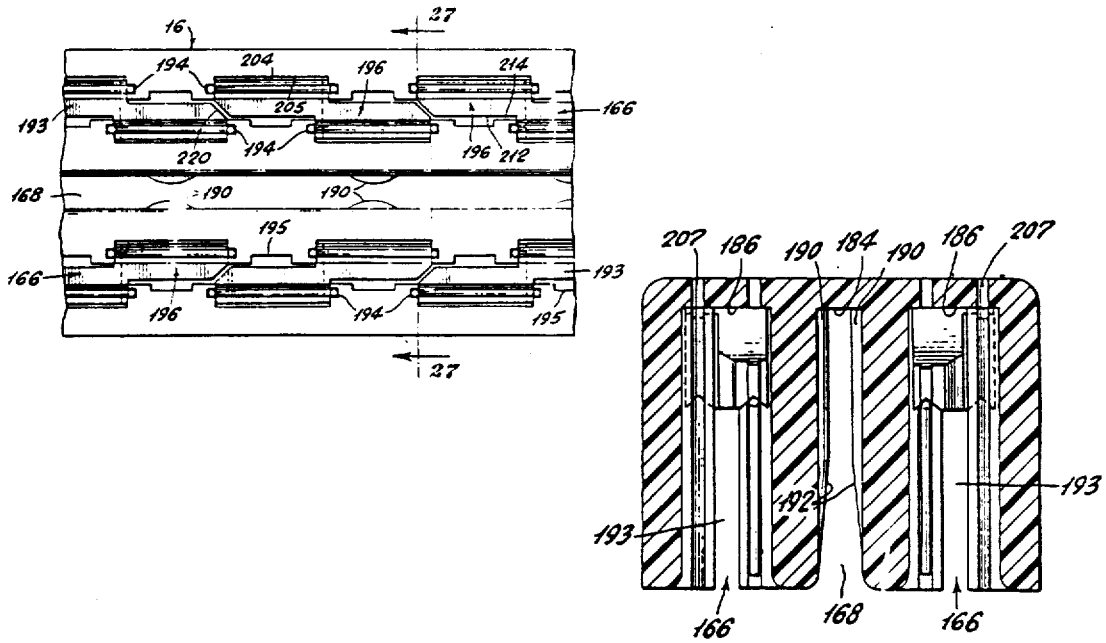

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *